No. 872,853. PATENTED DEC. 3, 1907.
T. SHARP.
HEATING DEVICE.
APPLICATION FILED MAY 25, 1907.
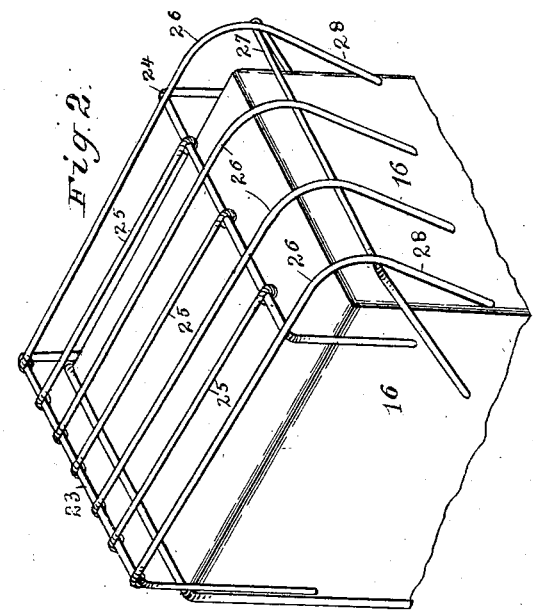
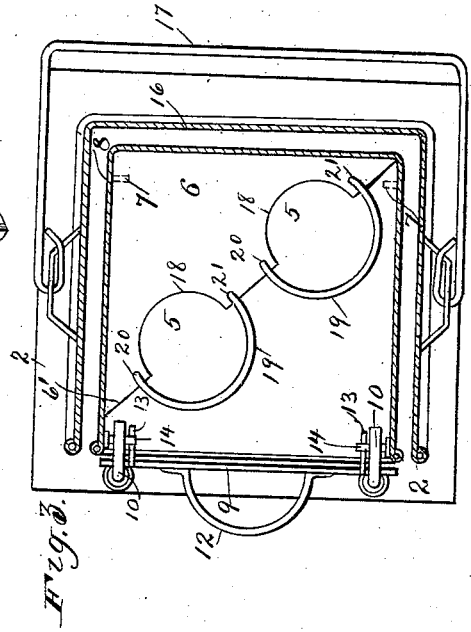
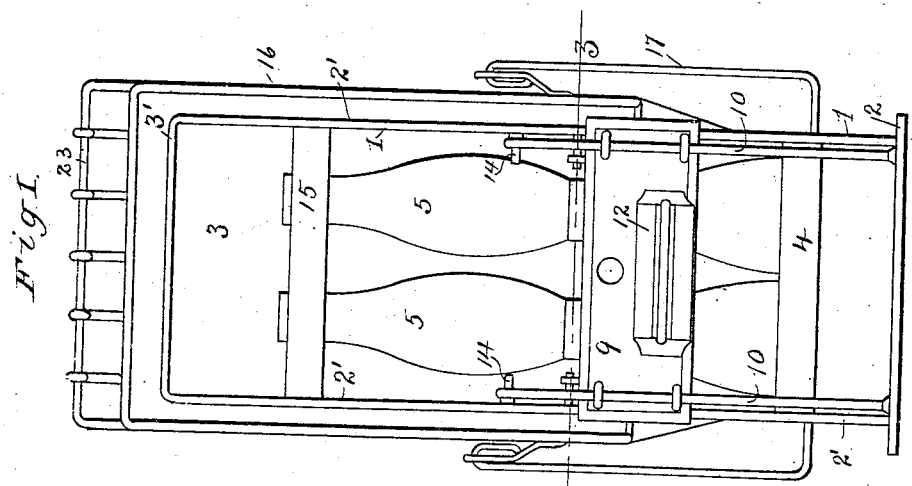
Witnesses
J. M. Fowler Jr.
J. P. Mawhinney
Inventor
Thomas Sharp,
By
Mason Fenwick & Lawrence
his Attorneys

UNITED STATES PATENT OFFICE.

THOMAS SHARP, OF CARLISLE, PENNSYLVANIA.

HEATING DEVICE.

No. 872,853.  Specification of Letters Patent.  Patented Dec. 3, 1907.

Application filed May 25, 1907. Serial No. 375,687.

*To all whom it may concern:*

Be it known that I, THOMAS SHARP, a citizen of the United States, residing at Carlisle, in the county of Cumberland and State of Pennsylvania, have invented certain new and useful Improvements in Heating Devices; and I do hereby declare the following to be a full, clear, and exact description of the invention, such as will enable others skilled in the art to which it appertains to make and use the same.

This invention relates to improvements in heating devices, and especially to that class of heating devices which are arranged to hold one or several lamps of substantially the ordinary construction.

The object for which this device is constructed is to provide a lamp holding casing and fender therefor, which is designed to prevent clothes or robes, that may be placed over and around the device, from contacting with the heated surfaces thereof, thereby lessening the danger of destroying the same by burning.

A further object of this invention is to form a plate in the casing which will hold one or more lamps, and to provide adjustable means whereby lamps of various dimensions may be secured in the casing.

With these and other objects in view, the invention comprises certain other novel constructions, combinations and arrangements of parts as will be hereinafter more fully described and claimed.

For the purpose of illustration the accompanying drawing discloses a heating device which is constructed for the purpose of holding two lamps.

In the drawings,—Figure 1 is a front elevation of my improved heating device. Fig. 2 is a fragmentary, perspective view of the upper portion of the device showing an improved fender formed according to the present invention, and Fig. 3 is a section through Fig. 1 on line 3, 3.

Like characters of reference designate corresponding parts throughout the several views.

Referring to the drawing, 1 designates the casing, 2 represents any approved form of base upon which the casing is mounted. The casing is formed with side walls 2', back 3 and top 3', but is left open in front. A false bottom or tray 4 is rigidly secured in the casing a short distance above the base 2 on which are placed the several lamps 5, which constitute the heating elements of the device. To firmly secure said heating elements in their proper positions as respects one another, and also to firmly secure the same in the casing, a plate 6 is provided, the same being of substantially triangular formation, and resting upon cleats 6' extending inwardly from the sides of casing 1. For the purpose of securing the plate 6 in the casing, studs or projections 7 are formed upon the upper face of the cleats at the rear of the casing, and register with notches 8 formed in plate 6. The plate 6 need not be limited to this shape, but may be formed of any convenient shape by which a number of heating elements may be secured in the casing.

The means employed for securing each heating element in proper position in the plate consists of a series of semi-circular openings 18 formed at the edge of the plate into which the several lamps are adapted to be placed. To hold the lamps in the opening 18 a plurality of semi-circular rings 19 are placed so as to engage the outer portions of the lamps and to span the openings 18. These rings 19 are pivotally secured to plate 6 at one end as at 20 and are provided with projections 21, which are adapted to be fitted into any of the openings 22 for adjusting the rings to lamps of various sizes.

A shield or fender 9 is placed across the front of the casing 1 and is slidingly mounted upon parallel vertically disposed guideways 10 by means of eyelets 11 formed upon the outer face of shield 9. A hand piece or gripping member 12 is also formed upon the face of the shield. In order to adjust the shield to various heights along the guideways, fingers 13 are formed extending rearwardly from the upper edge of shield 9 and engage a series of studs 14 projecting laterally from the inner edge of the sides 2' of the casing 1. A sufficient space is left between the casing and the guide-ways to admit of the movement of the shield in order to withdraw the fingers 13 from engagement with the studs 14, so that the shield may be placed in various positions. An additional shield or brace 15 is rigidly secured across the front of the casing 1 near its upper end.

The casing 1 carries a hood 16 over the upper portion of the casing and having its open side registering with the front of the casing. A bail 17 is pivotally secured to the sides of the hood by which the whole device may be conveyed from place to place.

Another important feature of this invention is the fender which is mounted upon the top of the hood, or if the hood be dispensed with, upon the top of the casing. In constructing the fender, bails 23 and 24 are secured to the sides of the hood 16, one being placed at the front of the device and the other at the back. These members 23 and 24 are so positioned as to allow any desired distance between the same. Between the two bails, stretching across the top of the device, supported by and having their ends secured to said bails, is a series of rods 25. Alternating with the rods 25 is a second series of rods 26 which extend rearwardly beyond bail 24 and curve downwardly where their ends are secured to a bail 27: said bail 27 extends forwardly and downwardly so as to support the ends of the rods 26 a certain distance from the hood or casing. The outer rods 26 have a downward extension 28 which also extends inwardly meeting the hood at a short distance from the top thereof.

A heater thus constructed is particularly designed to be used by placing the same at the back of a chair, or other convenient place, and then throwing a suitable covering over and around the chair and the heater. When in such use the heater just described will keep the wrappings a sufficient distance to prevent them from being burned or charred, thus enabling the use of the device without the danger of injuring any coverings which may be used.

Having thus fully described my invention, what I claim as new, and desire to secure by Letters Patent is,—

1. In a heating device, the combination with a casing containing heating elements and a hood over the upper end of said casing, a fender mounted upon said hood, said fender comprising a plurality of bails, a series of parallel rods mounted transversely upon said bails, said rods extending over said bails rearwardly and downwardly where their ends are secured to the back of said hood.

2. In a heating device, the combination with a casing open at one side, of a fender mounted on the upper end of said casing, an adjustable shield mounted across the open side of said casing, and means for securing the heating elements in said casing, said securing means comprising a removable plate of substantially triangular formation formed with semi-circular openings near the edge thereof through which said heating elements are secured, and adjustable semi-circular rings spanning the edge of said opening for the purpose of holding said heating elements securely in said openings.

3. A heating device, comprising a casing open at one side, heating elements in said casing, a hood over the upper end of said casing, a fender on said hood, and a shield adjustably secured across the front of said casing, means for adjustably securing said shield in position, said adjustable securing means comprising fingers on said shields, a series of studs extending inwardly from the sides of said casing, said fingers engaging said studs for holding said shield in position.

In testimony whereof I affix my signature in presence of two witnesses.

THOMAS SHARP.

Witnesses:
A. M. CLARK,
J. C. ECKELS.